United States Patent
Devoid et al.

(10) Patent No.: US 12,431,695 B1
(45) Date of Patent: Sep. 30, 2025

(54) APPARATUS FOR MOUNTING AN ELECTRICAL FIXTURE

(71) Applicant: Stone Creek Supplies, LLC, Milton, VT (US)

(72) Inventors: Scott Devoid, Charlotte, VT (US); Robert Klawiter, Milton, VT (US)

(73) Assignee: Stone Creek Supplies, LLC, Milton, VT (US)

( * ) Notice: Subject to any disclaimer, the term of this patent is extended or adjusted under 35 U.S.C. 154(b) by 0 days.

(21) Appl. No.: 19/054,400

(22) Filed: Feb. 14, 2025

(51) Int. Cl.
*H02G 3/08* (2006.01)
*H02G 3/14* (2006.01)

(52) U.S. Cl.
CPC .............. *H02G 3/081* (2013.01); *H02G 3/088* (2013.01); *H02G 3/14* (2013.01)

(58) Field of Classification Search
CPC .......... H02G 3/08; H02G 3/081; H02G 3/088; H02G 3/14; H02G 3/10; H02G 3/12; H02G 3/121; H02G 3/123; H05K 5/00; H05K 5/02; H05K 5/0217; H05K 5/03
USPC ........... 174/480, 481, 50, 53, 57, 58, 66, 67; 220/3.2–3.9, 4.02, 241, 242; 248/906
See application file for complete search history.

(56) References Cited

U.S. PATENT DOCUMENTS

| | | | | |
|---|---|---|---|---|
| 5,293,003 A | * | 3/1994 | Prairie, Jr. | H02G 3/121 220/3.7 |
| 6,194,657 B1 | * | 2/2001 | Gretz | H02G 3/123 174/53 |
| 7,071,414 B2 | * | 7/2006 | Kim | H02G 3/14 174/67 |
| 7,259,329 B1 | * | 8/2007 | Balma, Jr. | H02G 3/14 174/67 |
| 7,615,711 B2 | | 11/2009 | De Ambroggi et al. | |
| 7,674,976 B2 | * | 3/2010 | Eastin | H02G 3/14 174/67 |
| 7,687,712 B2 | * | 3/2010 | Price | H02G 3/14 174/67 |
| 8,222,522 B1 | * | 7/2012 | Easthouse | H02G 3/088 174/67 |

(Continued)

FOREIGN PATENT DOCUMENTS

| | | |
|---|---|---|
| EP | 1170844 A1 | 1/2002 |
| EP | 1458074 A1 | 9/2004 |
| EP | 2882056 A1 | 3/2016 |

*Primary Examiner* — Angel R Estrada
(74) *Attorney, Agent, or Firm* — Caldwell Intellectual Property Law (57) ABSTRACT

An apparatus for mounting an electrical fixture, comprising a fixture housing configured to accommodate at least an electrical fixture, a mounting frame having a front surface with an opening for receiving the fixture housing, wherein the opening is defined by a set of flanges extending outwardly from first pair of opposite sides of the mounting frame against a mounting surface, and a set of mounting tabs extending inwardly from a second pair of opposite sides of the mounting frame, wherein each mounting tab of the set of mounting tabs includes a hole for receiving a fastener to secure, the fixture housing to the mounting frame, and a cover plate flush with the mounting surface, wherein the cover plate includes a secure mechanism positioned on a rear surface of the cover plate, aligned with the at least one hole, and wherein the cover plate is removably attached to the mounting frame.

20 Claims, 7 Drawing Sheets

(56) References Cited

U.S. PATENT DOCUMENTS

| | | | | |
|---|---|---|---|---|
| 8,445,779 B1* | 5/2013 | Gretz | ............... | H02G 3/123 |
| | | | | 174/53 |
| 8,445,780 B1* | 5/2013 | Robins | ............... | H02G 3/14 |
| | | | | 174/67 |
| 8,610,004 B2* | 12/2013 | Solan | ............... | H02G 3/123 |
| | | | | 174/502 |
| 9,000,298 B2* | 4/2015 | Byrne | ............... | H02G 3/14 |
| | | | | 174/67 |
| 9,101,051 B1* | 8/2015 | Ferrara | ............ | H05K 5/0217 |
| 11,258,243 B1* | 2/2022 | Gretz | ............... | H02G 3/126 |
| 11,476,651 B1* | 10/2022 | Mon | ............... | H02G 3/123 |
| 11,990,736 B2 | 5/2024 | Gow et al. | | |

* cited by examiner

APPARATUS FOR MOUNTING AN ELECTRICAL FIXTURE

FIELD OF THE INVENTION

The present invention generally relates to the field of mounting electrical fixtures. In particular, the present invention is directed to an apparatus for mounting an electrical fixture.

BACKGROUND

Electrical fixtures are ubiquitous in modern buildings, serving essential functions for lighting, power distribution, control systems, and much more. The installation and mounting of these fixtures present ongoing challenges for contractors, electricians, and homeowners alike. Traditional mounting methods often involve complex procedures, specialized tools, and can result in inconsistent or unsightly finishes.

The integration of electrical fixtures into various architectural designs and surface materials requires versatile mounting solutions. Existing mounting systems may struggle to accommodate different fixture sizes, depths, and configurations while maintaining a clean, flush appearance with the surrounding surface. This challenge is particularly pronounced in renovation projects or when updating older structures with modern electrical components.

Furthermore, the accessibility of electrical fixtures for maintenance, repair, or replacement is a critical consideration. Many current mounting solutions make it difficult to access the internal components of fixtures without causing damage to the surrounding surface or requiring extensive disassembly. This can lead to increased time and cost for routine maintenance tasks. Proper insulation, grounding, and protection against moisture or debris ingress are essential factors that must be addressed in any mounting solution. Additionally, as building codes and energy efficiency standards evolve, the mounting system should provide stable and secure attachment to prevent accidents or failures over time.

The aesthetic appeal of electrical fixtures and their mounting systems has become increasingly important in both residential and commercial spaces. Consumers and designers seek solutions that blend seamlessly with various interior styles, from minimalist modern to traditional decor. This demand for visual cohesion presents an additional challenge in developing versatile and adaptable mounting systems. Improvements that address installation efficiency, adaptability to various fixture types and sizes, ease of maintenance access, safety, and aesthetic integration are highly desirable in the industry.

SUMMARY OF THE DISCLOSURE

According to an aspect of the present disclosure, an apparatus for mounting an electrical fixture is provided. The apparatus includes a fixture housing configured to accommodate at least an electrical fixture. The apparatus includes a mounting frame having a front surface with an opening for receiving the fixture housing. The opening is defined by a set of flanges extending outwardly from a first pair of opposite sides of the mounting frame against a mounting surface, and a set of mounting tabs extending inwardly from a second pair of opposite sides of the mounting frame. Each mounting tab of the set of mounting tabs includes at least one hole for receiving a fastener to secure at least one side of the fixture housing to the mounting frame. The apparatus includes a cover plate flush with the mounting surface. The cover plate includes a secure mechanism positioned on a rear surface of the cover plate. The secure mechanism is aligned with the at least one hole. The cover plate is removably attached to the mounting frame.

According to other aspects of the present disclosure, the apparatus may include one or more of the following features. The cover plate and the mounting surface may be made of the same material. The cover plate may include a sealing element positioned on the rear surface, around the perimeter of the cover plate. The secure mechanism may be movably attached to the sealing element. The secure mechanism may include at least one magnet, and the cover plate may be magnetically attached to the front surface of the mounting frame. The fastener within the first set of fasteners may include a flat-head screw. The secure mechanism may include a plurality of magnets positioned diagonally with respect to each other.

Each mounting tab of the set of mounting tabs may include a U-shaped structure with a central portion extending inwardly from the edge of the opening, and at least two side portions extending perpendicular from the ends of the central portion. The U-shaped structure may include a plurality of recesses between the central portion and the at least two side portions. The central portion may include one or more central holes for receiving a first set of fasteners, and each side portion of the at least two side portions may include one or more corner holes for receiving a second set of fasteners. The first set of fasteners may be configured to secure, using an attachment means, the at least one electrical fixture within the fixture housing. The attachment means may include a mounting bracket configured to secure the at least an electrical fixture in a fixed position within the fixture housing.

The mounting bracket may include a central body portion having a cutout for receiving the at least an electrical fixture, and a set of arms extending from the central body portion towards the second pair of opposite sides. Each arm may include at least one hole aligned with the at least one hole on the corresponding mounting tab for receiving the fastener to secure the mounting bracket to the set of mounting tabs of the mounting frame. The second set of fasteners may be configured to secure the fixture housing to the mounting frame. The set of mounting tabs may be recessed relative to the flanges, creating a recessed area around the opening.

The apparatus may further include a pair of extension arms mechanically attached to the at least one side of the fixture housing though the fastener. Each extension arm of the pair of extension arms may include a perpendicular, elongated section at a distal end of the extension arm, configured to brace against the mounting surface for securing the mounting frame to the mounting surface. The pair of extension arms may be symmetrically arranged on opposite sides of the fixture housing.

According to another aspect of the present disclosure, an apparatus for mounting a plurality of electrical fixtures flush with a mounting surface is provided. The apparatus includes at least one fixture housing. The apparatus includes a mounting frame having a front surface with an opening for receiving the at least one fixture housing. The opening is defined by a set of flanges extending outwardly from a first pair of opposite sides of the mounting frame against a mounting surface, and a set of mounting tabs extending inwardly from a second pair of opposite sides of the mounting frame. Each mounting tab of the set of mounting tabs include a set of holes for receiving a plurality of fasteners to secure at least one side of the at least one fixture housing to the mounting frame. The mounting frame and the fixture housing are configured to secure a plurality of electrical fixtures in a side-by-side arrangement within the opening. The apparatus includes a cover plate flush with the mounting surface. The cover plate include a secure mechanism positioned on a rear surface of the cover plate. The secure mechanism is aligned with the at least one hole. The cover plate is removably attached to the mounting frame. The cover plate and the mounting surface may be made of the same material.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for mounting electrical fixtures. The apparatus includes a fixture housing, a mounting frame, and a removable cover plate. The fixture housing is configured to accommodate at least one electrical fixture. The mounting frame has a front surface with an opening for receiving the fixture housing. The opening is defined by a set of flanges extending outwardly from a first pair of opposite sides of the mounting frame against a mounting surface, and a set of mounting tabs extending inwardly from a second pair of opposite sides of the mounting frame. Each mounting tab of the set of mounting tabs includes at least one hole for receiving a fastener to secure at least one side of the fixture housing to the mounting frame. The cover plate is flush with the mounting surface and includes a secure mechanism positioned on a rear surface of the cover plate. The secure mechanism is aligned with the at least one hole, and the cover plate is removably attached to the mounting frame.

In some aspects, said apparatus may facilitate a flush installation of the electrical fixture with the mounting surface, providing a seamless and aesthetically pleasing appearance. Additionally, the removable cover plate may allow for easy access to the electrical fixture for maintenance or replacement purposes. Said apparatus may also include features for securing the fixture housing to the mounting frame and for securing the mounting frame to the mounting surface, which may enhance the stability and durability of the installed electrical fixture. In some cases, the apparatus may be configured to mount a plurality of electrical fixtures in a side-by-side arrangement within the opening of the mounting frame. Exemplary embodiments illustrating aspects of the present disclosure are described below in the context of several specific examples.

Figure 1A:
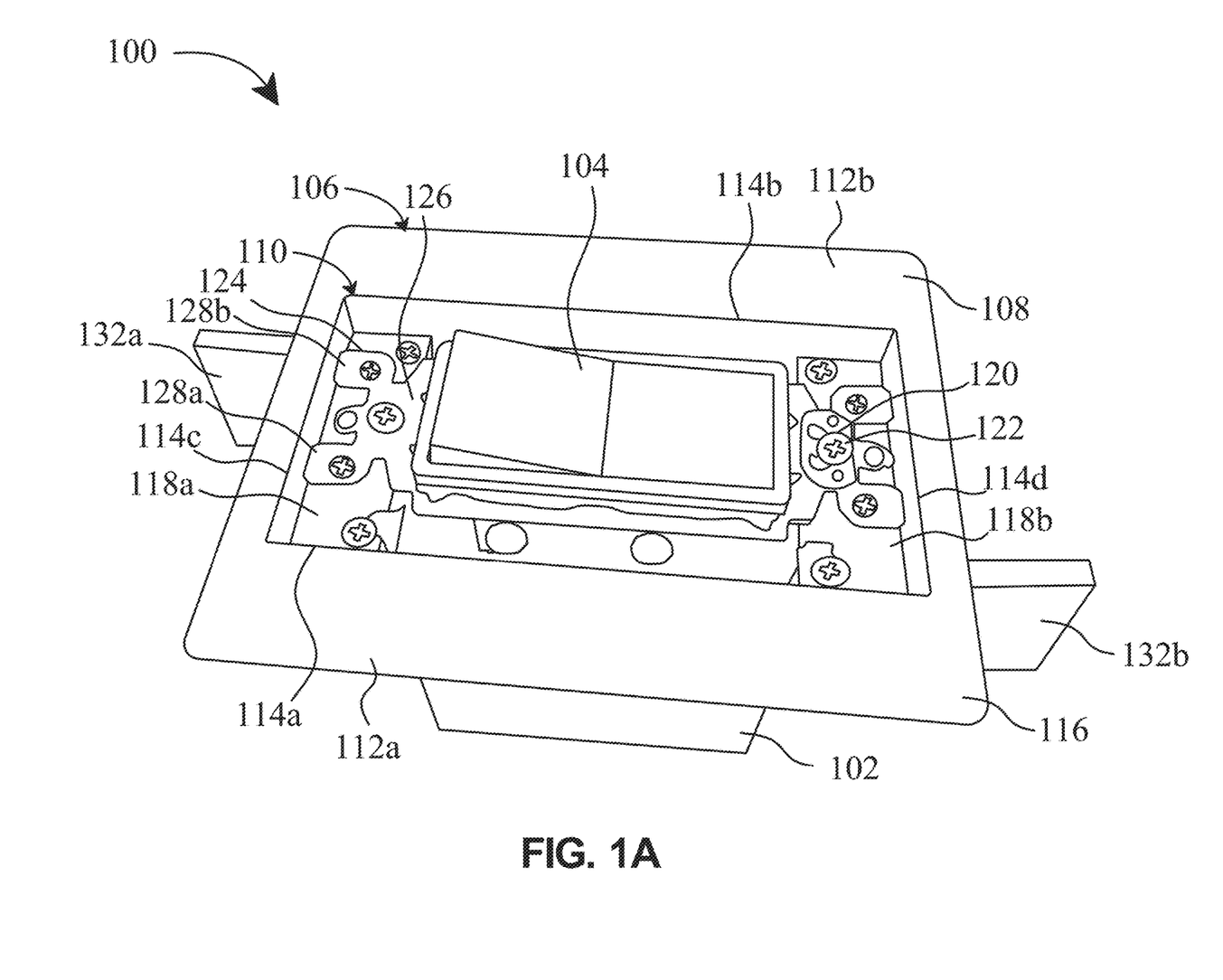
FIGS. 1A-B illustrate perspective views of an exemplary embodiment of an apparatus for mounting an electrical fixture, according to aspects of the present disclosure.
Figure 1B:
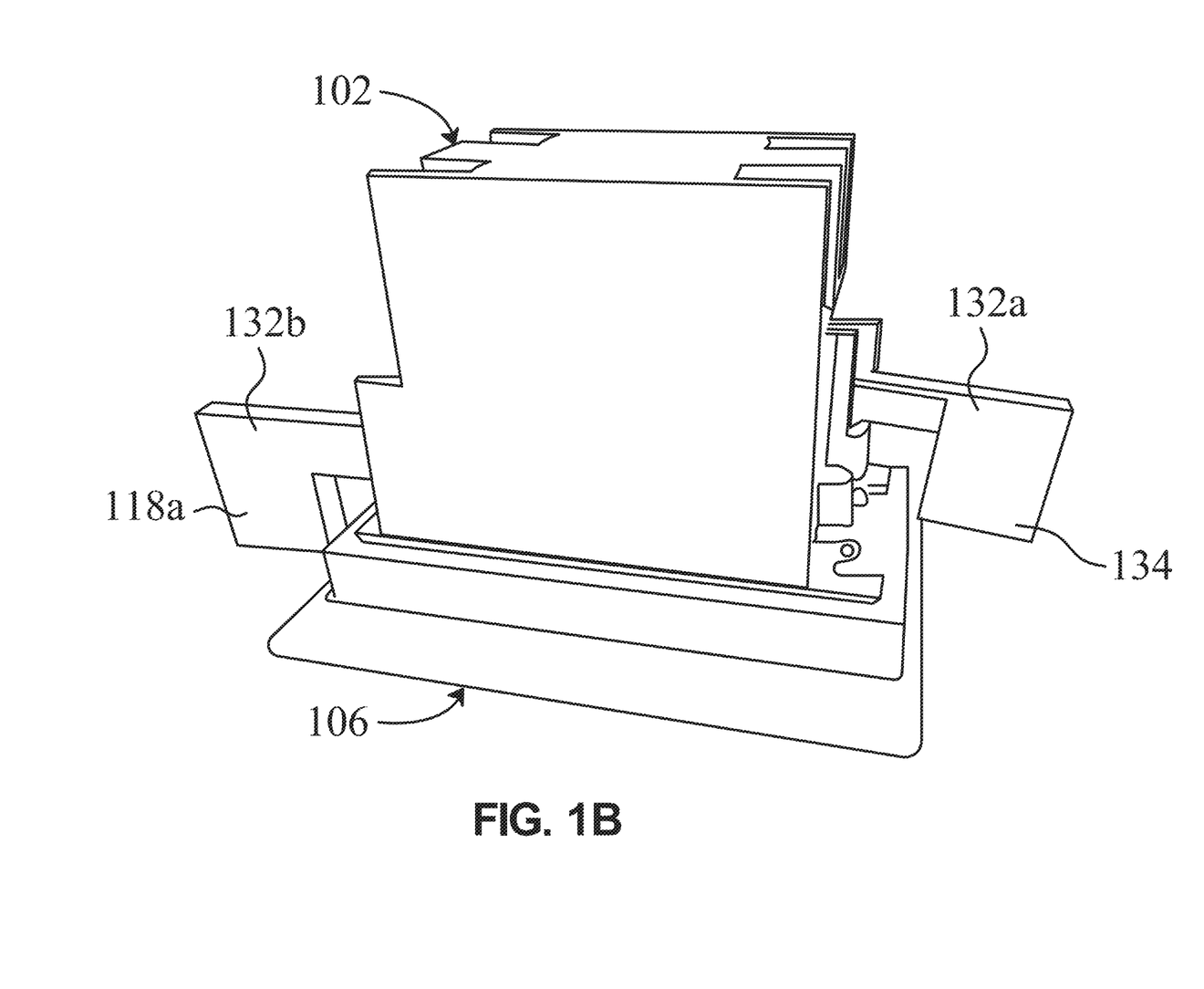

Referring now to FIGS. 1A-B, perspective views of an exemplary embodiment of an apparatus 100 for mounting an electrical fixture are illustrated. Apparatus 100 includes a fixture housing 102 configured to accommodate at least an electrical fixture 104. As used in this disclosure, a "fixture housing" is a structural component that supports at least an electrical fixture and facilitates the at least an electrical fixture secure installation. An "electrical fixture," for the purpose of this disclosure, is an electrical device that is installed in a building to provide at least an electrical function. In one embodiment, fixture housing 102 may include a protective enclosure designed to ensure at least an electrical fixture 104 are properly positioned and aligned. In some cases, fixture housing 102 may be made from durable materials such as metal, plastic, or other composite materials, and may be configured to hold more than one electrical fixtures 104. As a non-limiting example, fixture housing 102 may feature a rectangular or square shaped enclosure with one or more openings or slots that align with corresponding electrical fixtures.

With continued reference to FIGS. 1A-B, in some cases, exemplary embodiments of electrical fixtures 104 may include, without limitation, lighting or dimmers that allow for adjustable control of lighting levels, power outlets that provide access to electrical power for plugged devices, switches used to control the flow of electricity appliances (e.g., lights, fans, etc.), control panels or any other centralized units for managing multiple electrical systems (for example, within a building), among others. In some cases, each electrical fixture may be designed to fit within fixture housing 102 and may be secured, using one or more attachment means as described below e.g., screws, brackets, or clips. Fixture housing 102 may include one or more electrical connections for wiring and connecting at least an electrical fixture 104 to external electrical system, for instance, and without limitation, building's electrical system. As a non-limiting example, electrical fixture 104 may include a front-facing portion that is accessible to a user and a rear portion that is enclosed within fixture housing 102, where electrical connections are made.

Referring to FIG. 1A, apparatus 100 includes a mounting frame 106 having a front surface 108 with an opening 110 for receiving fixture housing 102. As used in this disclosure, a "mounting frame" is a structural component designed to support a fixture housing and ensure the fixture housing is securely installed within a mounting surface. In some cases, mounting frame 106 may be constructed from durable materials such as, without limitation, metal, plastic, polylactic acid (PLA), acrylonitrile butadiene styrene (ABS) plastic, or composite materials to ensure long-lasting support and reliability. In some cases, mounting frame 106 may include a rectangular or square structure configured to be attached to a wall or other mounting surface. Mounting frame 106 may include a flat and smooth front surface 108. In an embodiment, front surface 108 of mounting frame 106 may include an outermost face of mounting frame 106 that is exposed to view (without cover plate) when apparatus 100 as described herein is installed. As a non-limiting example, front surface 108 may be an interface between mounting frame 106 and cover plate (as described below), ensuring a flush and aesthetically pleasing appearance when cover plate is attached.

Figure 2:
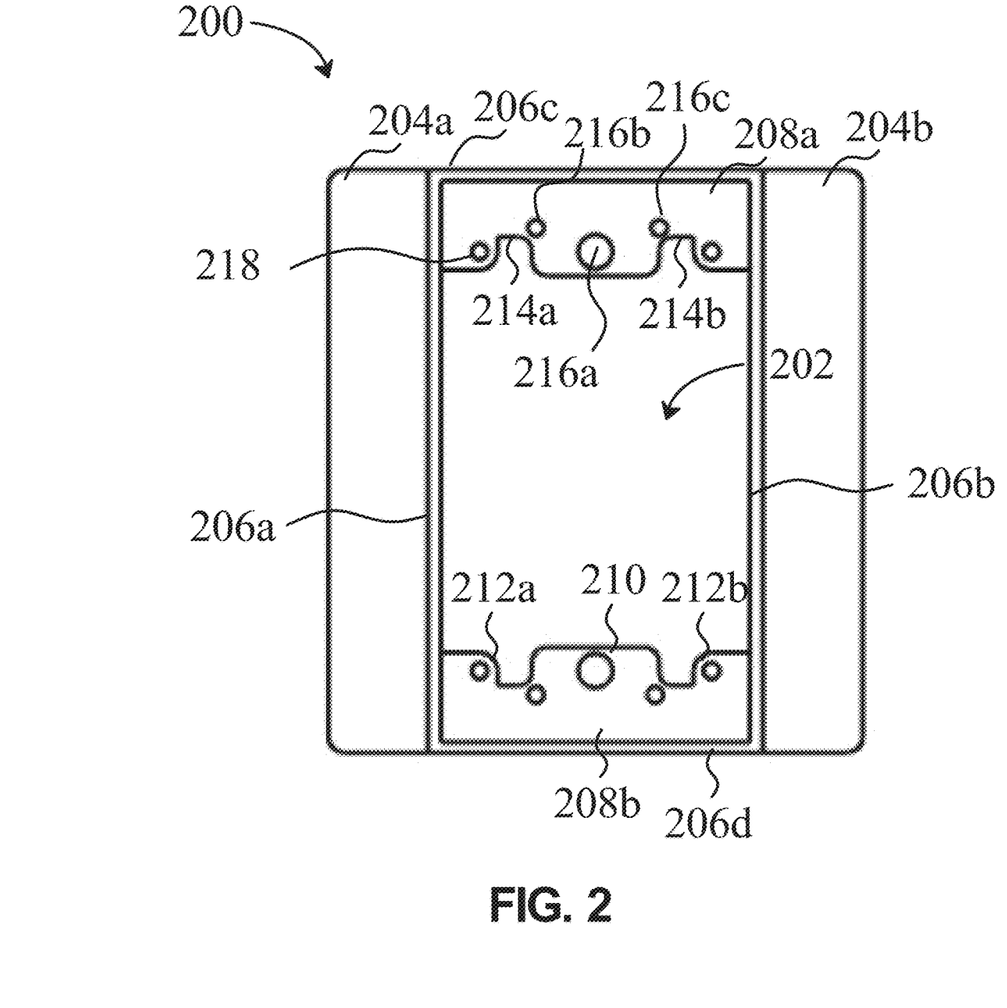
FIG. 2 illustrates an orthogonal front view of an exemplary embodiment of an electrical fixture mounting frame, according to aspects of the present disclosure.
Figure 5:
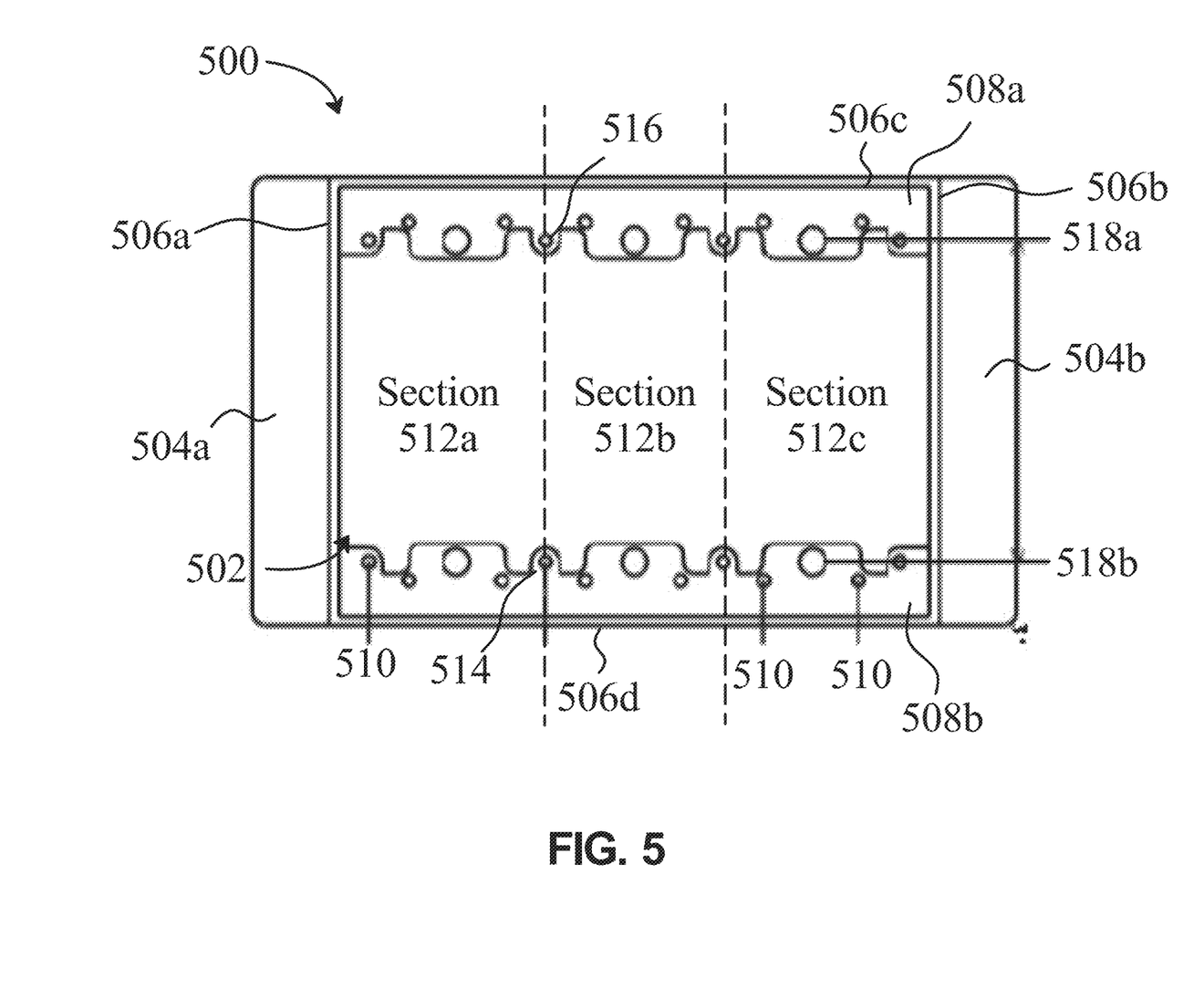
FIG. 5 depicts an orthogonal front view of an exemplary embodiment of an electrical fixture mounting frame for a side-by-side arrangement of more than one electrical fixtures, according to aspects of the present disclosure.

With continued reference to FIG. 1A, as used in this disclosure, an "opening" is a cutout or void within front surface 108 designed to receive and accommodate fixture housing 102. Opening 110 may allow fixture housing 102 to be securely positioned within mounting frame 106, providing access to at least an electrical fixture 104 housed within. Opening 110 is defined by a set of flanges 112a-b extending outwardly from a first pair of opposite sides 114a-b of mounting frame 106 (i.e., along a lateral axis) against a mounting surface 116 and a set of mounting tabs 118a-b extending inwardly from a second pair of opposite sides 114c-d of mounting frame 106 (i.e., along a longitudinal axis). In some cases, the dimension and shape of opening 110 may be designed to match corresponding fixture housing. As a non-limiting example, opening 110 of a rectangular-shaped mounting frame 106 may have a dimension ranged from ranging from 2¼" for a single gang (e.g., mounting frame 106 with one section as illustrated in FIG. 2), to 6¼" for a triple gang (e.g., mounting frame with three sections as illustrated in FIG. 5) and 4½" in height.

With continued reference to FIG. 1A, a "flange," for the purpose of this disclosure, is a structural extension of a mounting frame designed to provide secure attachment to a mounting surface. In one embodiment, each flange may have adhesive configured to firmly anchored flange to mounting surface 116. In some cases, adhesive may include industrial-grade adhesive. As a non-limiting example, flanges 112a-b may be adhered directly to a drywall surface using a strong construction adhesive. In some cases, set of flanges 112a-b may help to distribute the load evenly and provide a stable base for received fixture housing 102 and at least an electrical fixture 104 contained within it. In one embodiment, flanges 112a-b may be fabricated from materials consistent with mounting frame 106. As a non-limiting example, flanges 112a-b may be made from a high-strength plastic material and include a textured surface designed to increase friction and prevent, for instance, and without limitation, mounting frame 106 from slipping or shifting on mounting surface 116 once installed.

With continued reference to FIG. 1A, as described herein, a "mounting surface" refers to any surface to which mounting frame 106 is attached. In some embodiments, mounting surface may include, without limitation, a drywall, a concrete wall, wooden studs, tile surface, metal surface, or the like. Once installed, set of flanges 112a-b may be substantially levelled with mounting surface 116; however, there may be a slight difference between the level of flanges 112a-b and mounting surface depends on the thickness of the flanges 112a-b (e.g., 1-2 mm). As a non-limiting example, flanges 112a-b may be slightly higher than mounting surface 116. A layer of filler material (e.g., paint, wallpaper, tile, etc.) may be applied to build up mounting surface 116 until it is level with the height of flanges 112a-b.

With continued reference to FIG. 1A, as used in this disclosure, a "mounting tab" is a structural extension of mounting frame 106 designed to provide at least an attachment points for securing attached components, such as, without limitation, fixture housing 102. Each mounting tab of set of mounting tabs 118a-b includes at least one hole 120 (or slot) for receiving a fastener 122 such as, without limitation, screws or bolts, to secure, at least one side of fixture housing 102 to mounting frame 106. At least one hole 120 in each mounting tab of set of mounting tabs 118a-b may be strategically positioned to align with corresponding attachment points on fixture housing 102. As a non-limiting example, holes 120 may be circular or elongated slots. Circular holes may provide a fixed attachment point, while elongated slots may allow for some adjustability, accommodating slight variations in alignment and positioning of fixture housing 102 and/or at least an electrical fixture 104 contained within it during installation of apparatus 100.

With continued reference to FIG. 1A, in some embodiments, apparatus 100 may include a plurality of sets of fasteners 122. As a non-limiting example, a plurality of sets of fasteners 122 may include a first set of fasteners 122 and a second set of fasteners 122. For example, and without limitation, a central portion may include one or more central holes for receiving a first set of fasteners 122 and each side portion of the at least two side portions may include one or more corner holes for receiving a second set of fasteners 122. In some embodiments, a first set of fasteners 122 may be configured to secure, using an attachment means 124, at least an electrical fixture 104 within a fixture housing 102. In some embodiments, fastener 122 within a first set of fasteners 122 may include a flat-head screw. In some cases, fasteners 122 such as screws or bolts may be inserted, for example, and without limitation, through holes 120 to secure fixture housing 102 to mounting tabs 118a-b. In some embodiments, the choice of fastener depends on the material and thickness of mounting frame, fixture housing 102, as well as mounting tabs 118a-b. Fasteners 122 may include a plurality of head types, such as, without limitation, flat-head, pan-head, or hex head, to suit specific installation requirement. As a non-limiting example, one or more flat-head screws may be used to ensure a flush attachment with secure mechanism of cover plate as described below. Additionally, or alternatively, fasteners 122 may be equipped with washers or spacers to distribute the load more evenly and prevent damage to mounting tabs 118a-b and fixture housing 102. In some cases, lock washers or thread-locking compounds may be used to prevent fasteners from loosening over time due to vibrations or thermal expansion.

With continued reference to FIG. 1A, in some embodiments, fasteners 122 may be configured to secure, using an attachment means 124, at least an electrical fixture 104 within fixture housing 102. Attachment means 124 may include a mounting bracket configured to secure at least an electrical fixture 104 in a fixed position within fixture housing 102. Mounting bracket may include a central body portion 126 having a cutout for receiving at least an electrical fixture 104 and a set of arms 128a-b extending from the central body portion 126 towards second pair of opposite sides 114c-d, wherein each arm may include at least one hole aligned with hole 120 on the corresponding mounting tab for receiving fastener 122 to secure the mounting bracket to the set of mounting tabs of the mounting frame. When fasteners 122 are tightened, mounting bracket may securely hold at least an electrical fixture 104 in place e.g., at central of opening 110, preventing any undesired movement or displacement. In some cases, mounting bracket may be made from metal or high-strength plastic. Additionally, or alternatively, mounting bracket may be designed to accommodate various sizes and shapes of electrical fixtures, making it versatile for different applications.

Figure 3:
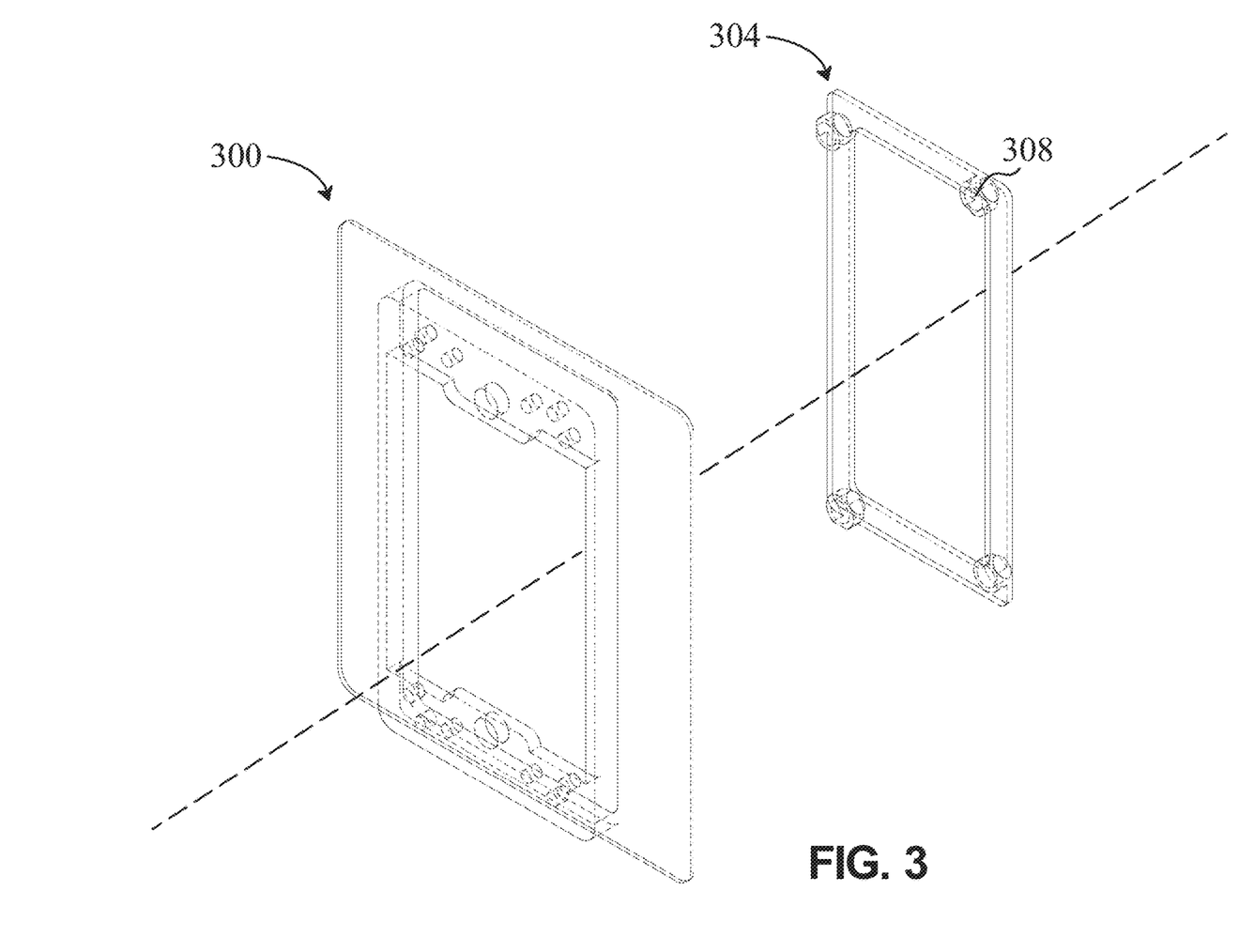
FIG. 3 illustrates an exploded view of an exemplary mounting frame and an exemplary cover plate.
Figure 4:
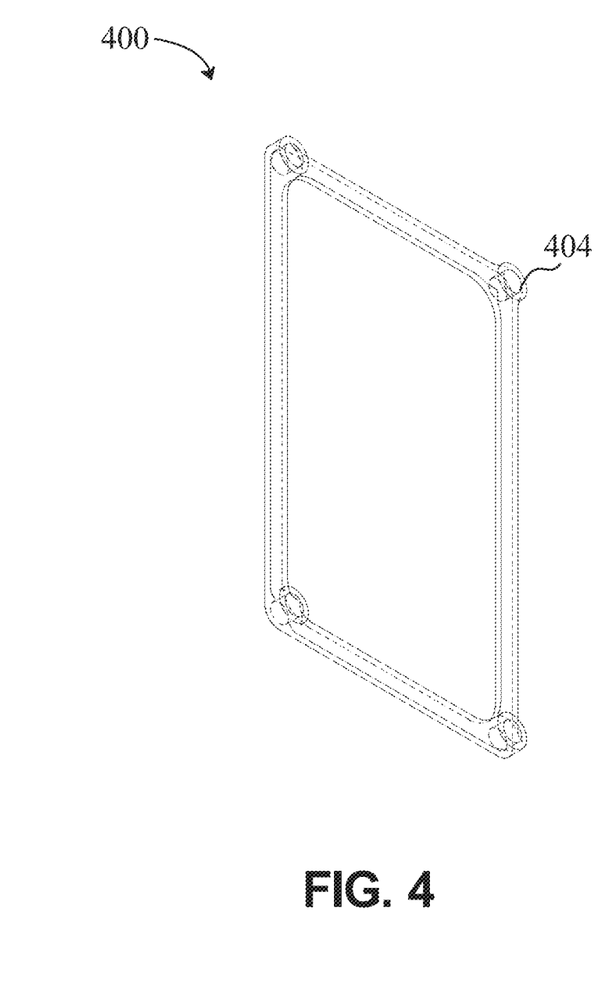
FIG. 4 illustrates a configuration of an exemplary cover plate.

With continued reference to FIG. 1A, apparatus 100 includes a cover plate flush with mounting surface 116. Exemplary configurations of cover plate is illustrated in FIGS. 3-4. A "cover plate" is a lid component designed to cover at least a portion of front surface 108 of mounting frame 106 and at least one electrical fixture 104 housed within fixture housing 102 attached to mounting frame 106. In some cases, the cover plate may provide a finished appearance to installation. In some cases, cover plate may be an integral part of apparatus 100. As a non-limiting example, at least one side of cover plate may be mechanically attached to at least one side of mounting frame 106 via one or more hinges. In some cases, cover plate and mounting surface 116 are made of the same material. As a non-limiting example, materials that can be used for both the cover plate and the mounting surface may include plaster, wood, metal, or composite materials. This may provide an aesthetically pleasing look that blends at least one electrical fixture 104 seamlessly with the surrounding décor.

With continued reference to FIG. 1A, cover plate includes a secure mechanism (not labeled for clarity) positioned on a rear surface of cover plate, wherein the secure mechanism is aligned with the at least one hole 120, and wherein cover plate is removably attached to mounting frame 106. As described herein, "removably attached" means cover plate is secured in such a way that it can be easily detached and reattached without causing damage to either component or the structure to which it is attached. A "secure mechanism," for the purpose of this disclosure, is any device used to fasten or hold a component in place, preventing any unwanted movement of the component. As a non-limiting example, secure mechanism may include one or more magnetic attachments. One or more magnets may be positioned on the rear surface of cover plate align with corresponding ferromagnetic elements, such as, without limitation, flathead screws, on set of mounting tabs 118a-b at hole 120. Cover plate may be securely held in place by magnetic force. Cover plate may be removed by simply pulling it away from mounting frame 106. In other embodiments, secure mechanism may additionally, or alternatively include one or more snap-fit clips, hook and loop fasteners, additional screws or bolts, among others. As a non-limiting example, Velcro may be used as additional secure mechanism, wherein one part of Velcro may be affixed to set of mounting tabs 118a-b and the other part may be affixed to rear surface of cover plate.

Referring to FIG. 1B, apparatus 100 may further include a pair of extension arms 132a-b mechanically attached to the at least one side of fixture housing 102 though fastener 122. Each extension arm of the pair of extension arms 132a-b may include a perpendicular, elongated section 134 at a distal end of the extension arm, configured to brace against mounting surface 116 (e.g., drywall) for securing the mounting frame 106 to mounting surface 116. In some embodiments, mounting frame 106 may include a pair of extension arms 132a-b behind the mounting frame 106. In a non-limiting example, a pair of extension arms 132a-b may be mechanically attached to mounting frame 106. In another non-limiting example, a pair of extension arms 132a-b may be mechanically attached to fixture housing 102. In one embodiment, pair of extension arms 132a-b may be configured to improve the stability of apparatus 100 by distributing the load and providing a broader base of support. In some cases, perpendicular, elongated section 134 at distal end of each extension arm may be designed to make firm contact with mounting surface 116 via insertion, preventing any lateral movement and ensuring that mounting frame 106 remains securely in place. In some cases, each extension arm of the pair of extension arms 132a-b may be adjustable, allowing for customization to fit various depths of fixture housing 102. In one embodiment, each extension arm of the pair of extension arms 132a-b may be extended or retracted as needed along a vertical axis. Additionally, or alternatively, pair of extension arms 132a-b may be symmetrically arranged on opposite sides of fixture housing 102. Each extension arm may be positioned on either side of fixture housing 102, mirroring each other. In some cases, symmetrical arrangement may include a central symmetry configuration. When installed, symmetrical extension arms 132a-b may provide a balanced counterforce to any pressure exerted on fixture housing, preventing fixture housing from tilting or shifting. Further, pair of extension arms 132a-b may be detachable.

Now referring to FIG. 2, an orthogonal front view of an exemplary embodiment of an electrical fixture mounting frame 200 is illustrated. Mounting frame 200 may include an opening 202 defined by a set of flanges 204a-b extending outwardly from a first pair of opposite sides 206a-b of mounting frame 200 and a set of mounting tabs 208a-b extending inwardly from a second pair of opposite sides 206c-d of mounting frame 200. As a non-limiting example, mounting frame 200 may include a height h, measured from the top edge 206c to bottom edge 206d of mounting frame 200, ranging from 4⅝"-5¼" inches, preferably 4⁹⁄₁₆ inches. Mounting frame 200 may include an overall width w, measured from the left edge of first flange 204a to the right edge of second flange 204b, ranging from 2¾"-4¼" for a single gang. In another non-limiting example, mounting frame 200 may include an overall width of 4³⁄₁₆ inches. Mounting frame 200 may include a width of opening 202, measured from left edge 206a to right edge 206b of mounting frame 200, ranging from 2¼" for a single gang, to 6¼" for a triple gang. In a non-limiting example, mounting frame 200 may include a width of opening 202 of 2⅝ inches.

With continued reference to FIG. 2, each mounting tab of set of mounting tabs 208a-b may include a U-shaped structure with a central portion 210 extending inwardly from the edge of opening 202 e.g., second pair of opposite sides 206c-d, and at least two side portions 212a-b extending perpendicular from the ends of the central portion 210. U-shaped structure may include a plurality of (molded) recesses 214a-b between central portion 210 and at least two side portions 212a-b. Plurality of recesses may be symmetrical with respect to central portion 210. In some cases, recesses 214a-b may facilitate the routing of wires and cables of at least an electrical fixture contained within fixture housing.

With continued reference to FIG. 2, central portion 210 of U-shape structure may include one or more central holes 216a-c for receiving a first set of fasteners. In some cases, first set of fasteners may be configured to secure, using attachment means such as, without limitation, mounting bracket as described above with reference to FIG. 1A, at least one electrical fixture within the fixture housing. In one or more embodiment, central holes 216a-c may have different sizes; for instance, and without limitation, first central hole 216a positioned at the center of central portion 210 may have a larger diameter (e.g., 4-5 mm) compared to second central hole 216b and third central hole 216c on its sides (e.g., 3-4 mm). In some cases, U-shape structure may include 1, 2, 3, 4, 5, 6, 7, 8, 9, 10, or more central holes.

With continued reference to FIG. 2, each side portion of at least two side portions 212a-b may include at least one corner hole 218 for receiving a second set of fasteners. In some cases, second set of fasteners may be configured to secure fixture housing to mounting frame 200. In an embodiment, second set of fasteners may include one or more flat head screws. In some cases, side portions 212a-b may be symmetrical with respect to central portion 210. In some cases, side portions 212a-b may each include a rounded edge around at least a portion of the periphery of corresponding corner hole 218 (and some of central holes e.g., second central hole 216b and third central hole 216c), wherein the rounded edge is characterized by a gentle curvature or fillet that transition from a flat edge to a first recess 214a or from a second recess 214b to the flat edge of the mounting tab (or within each recess). In some cases, each corner hole 218 may be the same size; for example, and without limitation, each corner hole 218 may have a consistent diameter of 3-4 mm. In some cases, U-shape structure may include 1, 2, 3, 4, 5, 6, 7, 8, 9, 10 or more corner holes.

Referring now to FIG. 3, an exploded view of an exemplary mounting frame 300 and exemplary cover plate 304 is illustrated. Mounting frame 300 may be designed to securely hold and support fixture housing and its associated electrical fixtures. Mounting frame 300 may include a central opening, which is configured to receive a fixture housing. Surrounding the central opening are set of flanges and set of mounting tabs. Each mounting tab of set of mounting tabs may include a U-shape structure having a central portion, flanked by two side portions on each side of the central portion. Central portion may include a plurality of central holes and each side portion may include at least a corner hole. In some cases, the center of first central hole may be aligned with the center of each corner hole on the same mounting tab. Plurality of central holes and corner holes may be designed to accommodate a plurality of fasteners that secure the fixture housing to mounting frame 300 and at least an electrical fixture to the secured fixture housing.

With continued reference to FIG. 3, set of mounting tabs are designed to be recessed relative to flanges, creating a recessed area around opening. Set of mounting tabs may be positioned lower than set of flanges, ensuring that the cover plate is flush with mounting surface once attached and installed. As a non-limiting example, recessed area created by set of mounting tabs may have a specific height difference relative to set of flanges. Height h of recessed area may range between $\frac{1}{8}"$-$\frac{1}{2}"$ inches. In a non-limiting example, height of recessed area may be lower than the plane of set of flanges (or mounting surface). Such height difference may ensure that the fixture housing and housed electrical devices are sufficiently recessed to sit flush with mounting surface when cover plate is attached on top of recessed area.

With continued reference to FIG. 3, in some embodiments, cover plate 304 may be designed to cover the front surface of mounting frame, providing both protection and an aesthetically pleasing finish. In some cases, cover plate 304 may feature openings that correspond to the operational parts of the electrical fixtures, such as switches, buttons, or outlets, allowing users to access and operate the fixtures without removing the cover plate.

With continued reference to FIG. 3, in some cases, cover plate 304 and mounting surface may be made of the same material. This ensures a uniform appearance and seamless integration with the surrounding environment. Exemplary materials for both cover plate 304 and mounting surface may include, without limitation, drywall, plaster, wood, metal, or high-impact plastic. For instance, and without limitation, in a residential setting, both the cover plate and the mounting surface may be made of high-impact plastic, providing durability and a consistent look.

With continued reference to FIG. 3, cover plate 304 may include one or more secure mechanisms 308 and a sealing element that ensure a tight and stable attachment to mounting frame. As used in this disclosure, a "sealing element" is a component designed to create an airtight and dustproof seal between cover plate and mounting frame. In an embodiment, sealing element may prevent the ingress of dust, moisture, debris, air drafts, and any other environmental contaminants into fixture housing through central opening, thereby protecting electrical fixtures and ensuring their optimal performance and longevity. As a non-limiting example, sealing element may be positioned on the rear surface of cover plate 304 around its perimeter. Sealing element may be made from various materials including, but is not limited to rubber, foam, silicone, or other flexible and compressible substances. When cover plate 304 is attached to mounting frame, sealing element may be compressed between rear surface of cover plate 304 and front surface of mounting frame. In some cases, such compression may create a barrier that prevents dust, moisture, debris, and air drafts from entering fixture housing. In other cases, sealing element may also help to reduce vibrations and noise. Additionally, or alternatively, rear surface may include one or more alignment features, such as ridges or slots, to facilitate precise positioning during installation.

With continued reference to FIG. 3, in some embodiments, secure mechanism 308 may include at least one magnet, and cover plate 304 may be magnetically attached to front surface of mounting frame. Such magnetic attachment may allow for easy removal and reattachment of the cover plate 304, facilitating quick access to contained electrical fixtures for maintenance or adjustments. In some cases, magnets may be strategically positioned on the rear side of the cover plate to align with corresponding ferromagnetic elements on the mounting frame e.g., the fastener. As a non-limiting example, magnets may be aligned with corner holes on set of mounting tabs. Magnets may be directly attached to flat-head screws within aligned corner holes. Flat-head screw may ensure that the flat surface of the fastener head sits flush with the bottom surface of the magnets, providing a stronger magnetic force. In some embodiments, secure mechanism 308 may include a plurality of magnets positioned along with the perimeter of a cover plate.

With continued reference to FIG. 3, additionally, or alternatively, secure mechanism 308 may include a plurality of magnets positioned diagonally with respect to each other. In some cases, sealing element may also be used to attach secure mechanisms 308 e.g., one or more magnets to the rear surface of cover plate 304. In some cases, secure mechanisms 308 may be movably attached to the sealing element. As a non-limiting example, sealing element may include a track configured to allow secure mechanism such as magnets to be adjusted by sliding them along the track. Such sliding feature may enable the positions of one or more magnets to be adjusted to ensure optimal alignment and contact with corresponding elements on mounting frame. In some cases, additional magnets may be subsequently added to increase holding force and stability of cover plate 304. As a non-limiting example, additional magnets may be placed in the track of sealing element to enhance the magnetic attachment.

Referring now to FIG. 4, an exemplary embodiment of a cover plate 400 for an electrical fixture mounting apparatus is illustrated. In a non-limiting example, secure mechanism 404 may include four magnets, each positioned on one side of a cover plate 400 and these magnets can be placed at any location along their respective sides of the cover plate 400

(e.g., a cover plate illustrated in FIG. 3). As illustrated in FIG. 4, in another non-limiting example, secure mechanism 404 may include four magnets where each of the four magnets is positioned at an end of each corner of a cover plate 400.

Now referring to FIG. 5, orthogonal front view of an exemplary embodiment of an electrical fixture mounting frame 500 for a side-by-side arrangement of more than one electrical fixtures is illustrated. In an embodiment, apparatus as described herein may be used for mounting a plurality of electrical fixtures flush with a mounting surface. Apparatus may include at least one fixture housing, a mounting frame 500 having a front surface with an opening 502 for receiving the at least one fixture housing, wherein the opening is defined by a set of flanges 504a-b extending outwardly from a first pair of opposite sides 506a-b of mounting frame 500 against a mounting surface, and a set of mounting tabs 508a-b extending inwardly from a second pair of opposite sides 506c-d of the mounting frame. Each mounting tab of the set of mounting tabs includes a set of holes 510 for receiving a plurality of fasteners to secure, at least one side of the at least one fixture housing to mounting frame 500, wherein mounting frame 500 and the fixture housing are configured to secure a plurality of electrical fixtures in a side-by-side arrangement within opening 502. Apparatus further includes a cover plate flush with the mounting surface, wherein the cover plate includes a secure mechanism positioned on a rear surface of the cover plate, wherein the secure mechanism is aligned with at least one hole of the set of holes 510, and wherein the cover plate is removably attached to mounting frame 500.

With continued reference to FIG. 5, as a non-limiting example, mounting frame 500 may be characterized by a series of openings and attachment points that are combined to form a larger, cohesive structure. Merged frame may include a plurality of sections 512a-c for accommodating, for example, and without limitation, three electrical fixtures. Each section of plurality of sections 512a-c may be designed to hold individual fixture housings or electrical fixture. As described herein a "side-by-side arrangement" refers to a configuration of multiple electrical fixtures or fixture housings placed adjacent to each other within a single mounting frame 500. In some cases, side-by-side arrange may include various spatial configurations including, but not limited to horizontal alignment, vertical stacking, grid-like arrangement, and the like. As non-limiting examples, electrical fixtures or fixture housing may be placed next to each other along a horizontal axis (e.g., horizontal alignment), stacked on top of each other along a vertical axis (e.g., vertical stacking), or placed in a grid-like arrangement (e.g., 2×2 grids, 3×3 grids, or other patterns that group fixtures both horizontally and vertically).

With continued reference to FIG. 5, each section of plurality of sections 512a-c may include a subset of holes having one or more central holes and corner holes. Each section of plurality of sections 512a-c may include two sections of set of mounting tabs 508a-b, each have a U-shaped structure, wherein the U-shaped structure is defined by a central portion and two side portions on each side of the central portion. When multiple frames merged together, side portions of adjacent frames may be combined to from a bridge 514 (i.e., a continuous structure without a flat edge). As a non-limiting example, for a mounting frame 500 with three sections, there may be 2 bridges positioned between central portion of each section. Bridge 514 may feature a central arch and at least a corner hole 516 positioned within the central arch.

With continued reference to FIG. 5, mounting frame 500 may have an overall width w, measured from left edge of first flange 504a to right edge of second flange 504b, ranging from 7-8 inches for triple gang. In a non-limiting example, mounting frame 500 may have an overall width of 7 and 13/16 inches. Mounting frame 500 may have an opening height h, measured from a primary central hole 518a (i.e., central hole with a larger diameter) within a first central portion on a first mounting tab 508a to a primary central hole 518b within a second central portion (aligned with the first central portion) on a second mounting tab 508b, ranging from 3"-3½" inches. In a non-limiting example, mounting frame 500 may have an opening height of 3¼ inches. The spacing between corner holes within the same section may range from 1⅝"-1⅞" inches. In a non-limiting example, spacing between corner holes within the same section may be 1 and 13/16 inches. The spacing between two side central holes (i.e., central holes that have smaller diameter, positioned on the side of the primary central hole) may range from 7/16"-⅝" inches. In a non-limiting example, spacing between two side central holes may include 15/16 inches.

Figure 6A:
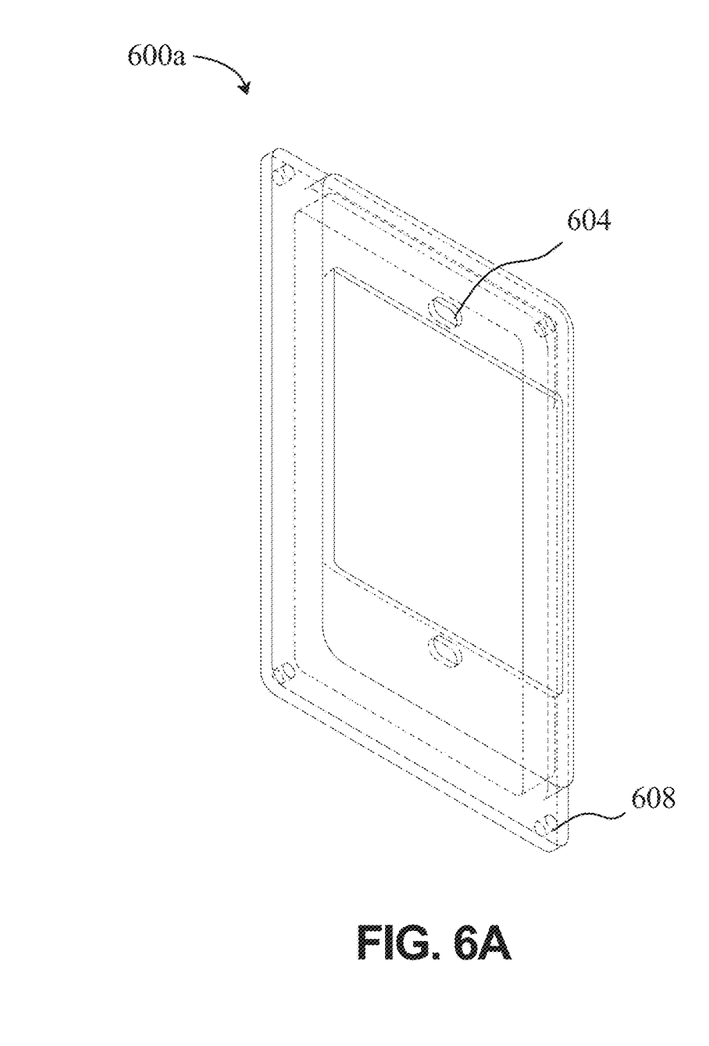
FIGS. 6A-B illustrate configurations of an exemplary mounting frames.
Figure 6B:
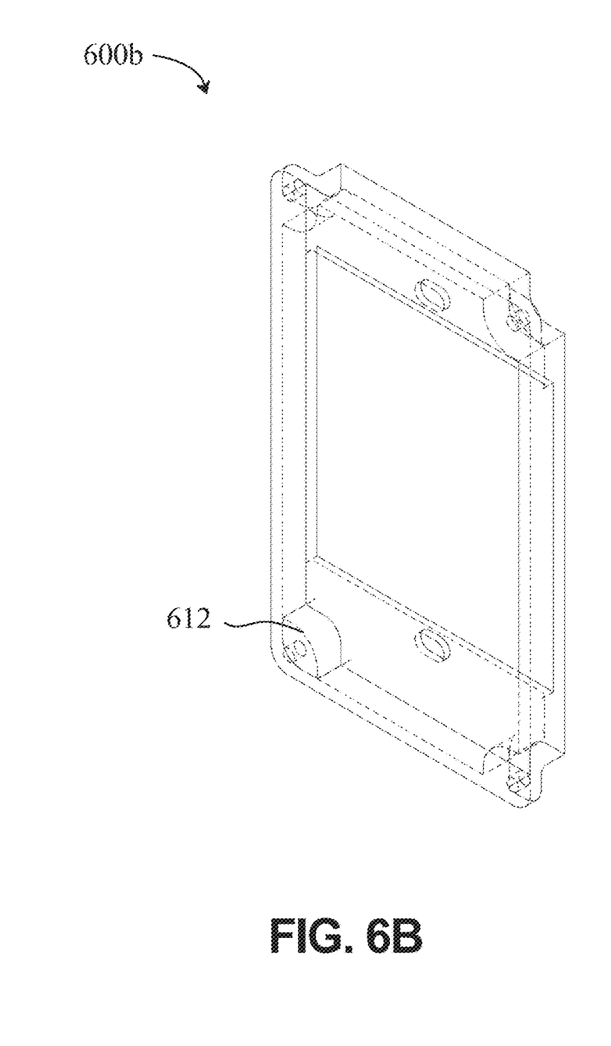

Referring now to FIGS. 6A-B, exemplary embodiments of a mounting frame 600a-b for an electrical fixture mounting apparatus are illustrated. In some embodiments, mounting frame 600a-b may include a set of mounting tabs. In some embodiments, each mounting tab of a set of mounting tabs may include a hole (e.g., central hole 604), to where fixture housing can be mechanically attached. In some embodiments, each corner of flanges may include a hole 608 designed for mechanical insertion of a fastener. For example, and without limitation, when mounting frame 600a-b needs to be installed into a wall (e.g., drywall), fasteners can be screwed or hammered into these holes 608 on the mounting tabs 118a-b, securing mounting frame 600a-b in place. As illustrated in FIG. 6A, in a non-limiting example, mounting surface of flanges of mounting frame may be flat. In a non-limiting example, mounting surface of flanges may include indentations 612. For instance, and without limitation, as illustrated in FIG. 6B, each corner of flanges may be indented so that the indented corners can be embedded into a wall when the mounting frame 600b is installed using screws or fasteners, ensuring that the corners remain concealed from view.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for mounting an electrical fixture, the apparatus comprises:
   a fixture housing configured to accommodate at least an electrical fixture;
   a mounting frame having a front surface with an opening for receiving the fixture housing, wherein the opening is defined by:
      a set of flanges extending outwardly from a first pair of opposite sides of the mounting frame against a mounting surface; and
      a set of mounting tabs extending inwardly from a second pair of opposite sides of the mounting frame, wherein each mounting tab of the set of mounting tabs comprises:
         at least one hole for receiving a fastener to secure, at least one side of the fixture housing to the mounting frame; and
   a cover plate flush with the mounting surface, wherein the cover plate comprises:
      a front surface, wherein the front surface comprises a continuous surface; and
      a secure mechanism positioned on a rear surface of the cover plate,
      wherein the secure mechanism is aligned with the at least one hole, and wherein the secure mechanism is configured such that the cover plate is removably attached to the mounting frame.

2. The apparatus of claim 1, wherein the cover plate and the mounting surface are made of a same material.

3. The apparatus of claim 1, wherein the cover plate comprises a sealing element positioned on the rear surface, around a perimeter of the cover plate.

4. The apparatus of claim 3, wherein the secure mechanism is movably attached to the sealing element.

5. The apparatus of claim 1, wherein the secure mechanism comprises at least one magnet, and the cover plate is magnetically attached to the front surface of the mounting frame.

6. The apparatus of claim 1, wherein the fastener within a first set of fasteners comprises a flat-head screw.

7. The apparatus of claim 1, wherein the secure mechanism comprises a plurality of magnets positioned diagonally with respect to each other.

8. The apparatus of claim 1, wherein each mounting tab of the set of mounting tabs comprises:
   a U-shaped structure with a central portion extending inwardly from an edge of the opening, and at least two side portions extending perpendicular from ends of the central portion.

9. The apparatus of claim 8, wherein the U-shaped structure comprises a plurality of recesses between the central portion and the at least two side portions.

10. The apparatus of claim 8, wherein:
   the central portion comprises one or more central holes for receiving a first set of fasteners; and
   each side portion of the at least two side portions comprises one or more corner holes for receiving a second set of fasteners.

11. The apparatus of claim 10, wherein the first set of fasteners is configured to secure, using an attachment means, the at least an electrical fixture within the fixture housing.

12. The apparatus of claim 11, wherein the attachment means comprises a mounting bracket configured to secure the at least an electrical fixture in a fixed position within the fixture housing.

13. The apparatus of claim 12, wherein the mounting bracket comprises:
   a central body portion having a cutout for receiving the at least an electrical fixture; and
   a set of arms extending from the central body portion towards the second pair of opposite sides, wherein each arm comprises:
      at least one hole aligned with the at least one hole on a corresponding mounting tab for receiving the fastener to secure the mounting bracket to the set of mounting tabs of the mounting frame.

14. The apparatus of claim 10, wherein the second set of fasteners is configured to secure the fixture housing to the mounting frame.

15. The apparatus of claim 1, wherein the set of mounting tabs are recessed relative to the flanges, creating a recessed area around the opening.

16. The apparatus of claim 1, wherein the mounting frame comprises a pair of extension arms behind the mounting frame.

17. The apparatus of claim 16, wherein each extension arm of the pair of extension arms comprises a perpendicular, elongated section at a distal end of the extension arm, configured to brace against the mounting frame for securing the fixture housing to the mounting frame.

18. The apparatus of claim 16, wherein the pair of extension arms is symmetrically arranged on opposite sides of the fixture housing.

19. An apparatus for mounting a plurality of electrical fixtures flush with a mounting surface, the apparatus comprises:
   at least one fixture housing;
   a mounting frame having a front surface with an opening for receiving the at least one fixture housing, wherein the opening is defined by:
      a set of flanges extending outwardly from a first pair of opposite sides of the mounting frame against a mounting surface; and
      a set of mounting tabs extending inwardly from a second pair of opposite sides of the mounting frame, wherein each mounting tab of the set of mounting tabs comprises:
         a set of holes for receiving a plurality of fasteners to secure, at least one side of the at least one fixture housing to the mounting frame;
      wherein the mounting frame and the at least one fixture housing are configured to secure a plurality of electrical fixtures in a side-by-side arrangement within the opening; and
   a cover plate flush with the mounting surface, wherein the cover plate comprises:
      a front surface, wherein the front surface comprises a continuous surface; and
      a secure mechanism positioned on a rear surface of the cover plate, wherein the secure mechanism is aligned with at least one hole of the set of holes, and wherein the securing mechanism is configured such that the cover plate is removably attached to the mounting frame.

20. The apparatus of claim 19, wherein the cover plate and the mounting surface are made of a same material.

* * * * *